Dec. 6, 1960   B. R. BETTER ET AL   2,963,298
HYDRAULICALLY EXPANDING THIN WALLED TOOLS
Filed April 16, 1958   2 Sheets-Sheet 1

INVENTORS
BERNARD R. BETTER
RICHARD F. WHARTON
BY
ATTORNEYS

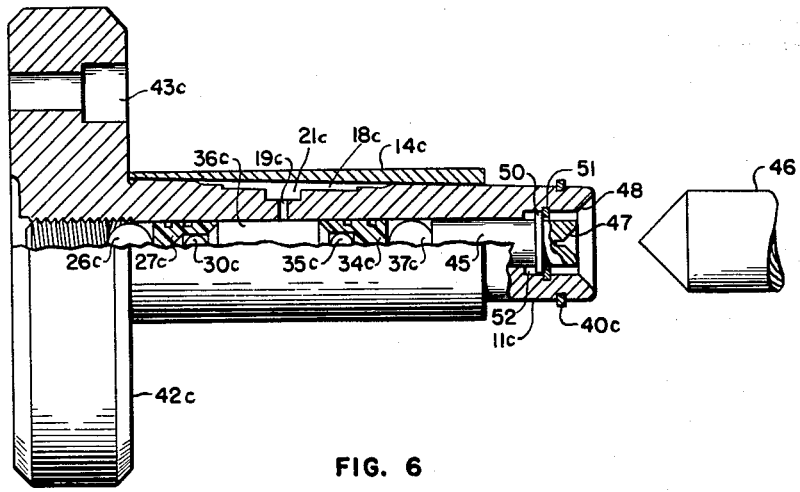
FIG. 6
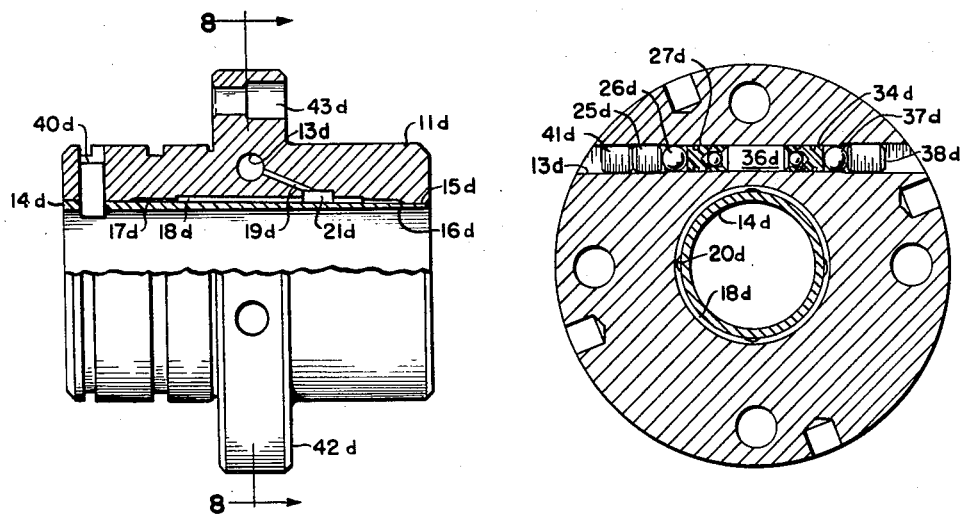
FIG. 7
FIG. 8
INVENTORS
BERNARD R. BETTER
RICHARD F. WHARTON
ATTORNEYS

United States Patent Office 2,963,298
Patented Dec. 6, 1960

2,963,298

HYDRAULICALLY EXPANDING THIN WALLED TOOLS

Bernard R. Better and Richard F. Wharton, Chicago, Ill., assignors to Scully-Jones and Company, Chicago, Ill., a corporation of Illinois Filed Apr. 16, 1958, Ser. No. 728,873

6 Claims. (Cl. 279—4)

This invention relates, in general, to hydrostatic tool or work holding devices known as mandrels or chucks for either the external or internal holding of tools or work means, and, in particular, to a new and improved hydrostatic tool or work holding device of the thin walled type.

Heretofore, conventional devices have used a thin walled cylindrical or shell member which is forced to expand by means of sealed internal hydraulic pressure created by means of a rather complicated mechanism. The shell member was held in place on a rigid body member which gave support to the shell member by welding or brazing. It is well known that welding or brazing is bound to leave a non-uniform pattern of residual stresses on the members so joined—an obviously undesirable feature on such devices.

Furthermore, such conventional devices have heretofore had complicated means of creating hydraulic pressure and a complicated system for replenishing lost fluid. Too, no means have been provided heretofore for safety of operation, and when the shell was subjected to extremely high pressures, rupturing or bursting of the shell was not uncommon and was dangerous. This situation is aggravated, as can be appreciated, by the non-uniform residual stresses left during the welding or brazing operation heretofore explained.

It is therefore a general object of our present invention to provide a new and improved hydrostatic work or tool holding device which overcomes the deficiencies of prior art devices.

More specifically, it is an object of our invention to provide a new and improved work or tool holding device which is provided with a new and improved means of sealing an expandable thin walled shell to a rigid body member which has inherent advantages in that the shell is not deformed by non-uniform patterns of residual stresses.

Still other specific objects of our invention are the provisions of a means of sealing the hydrostatic tool or work holding device against leakage, the provision of a less complicated system for the purposes of filling or replenishing the device with fluid, and the provision of an improved cooperation between the thin walled shell and the rigid body member whereby they operate to form a safety mechanism for the holding device.

Briefly, our invention comprises a relatively thin walled shell member having a cylindrical wall and a tapered wall, the latter cooperating with a tapered portion on a rigid body member so as to define a pressure chamber between the tapered body portion and the tapered shell wall. The end portions of the shell are secured in sealed relation to the tapered portion of the body element by means of a press fit therebetween and without O-ring seals or the like, and the rigid body member is provided with a bore and passageway means which contain a means operable to produce a hydrostatic pressure system to expand the shell member to hold a working tool or a work piece. The means to produce hydrostatic pressure in the body member, in accordance with our invention, is considerably more simplified than prior art means and comprises a pair of screw means at each end of the bore in one or more embodiments, or a set screw and a power actuatable means in others, and cup-like sealing means which react to the movement of the screws or the power actuatable means to produce hydrostatic pressure. By the proper manipulation of the screws and by arranging stop means therein, we have provided a simplified method of filling and obtaining fluid pressure in the holding device at a predetermined level.

It will be seen from a more detailed description hereinafter, that, by the use of the press fit of the shell to the rigid body member and by use of the tapered cooperating surfaces, if the pressure is accidentally increased beyond a predetermined amount, the expanding shell will merely slide with respect to the body member thus venting and reducing the pressure without damage to the shell—an important safety feature. In other words, by the provision of a tapered surface on a thin walled expansible shell member and a tapered surface on a rigid body member, we have defined a safety means in hydrostatic devices of this type. Furthermore, we have found that by constructing the shell of a particular type of material that our device has many inherent advantages.

It will be also seen from the more detailed description hereinafter that we have included in our holding device a means of reducing time lag between the time that pressure is created by means of the set screw, above referred to, and the time in which the shell will move to its predetermined expanded position, and conversely, the time when the pressure is released by movement of the set screw and the time in which expanded shell will return to its normal or unexpanded position; such time lag being due to the highly viscous fluids we prefer to use.

Still another object of our invention is a provision of a new and improved means of creating pressure in devices of this type and in filling and replenishing devices of this type.

Still another object of our invention is the provision of a new and improved means of reducing the time lag between the pressure creation or release and the expansion and contraction of the expandable member on devices of this type wherein highly viscous fluids are used.

We have also found that another important feature of our invention is the provision of a novel method of forming such tool or work holding devices, as herein described. By so constructing and arranging various elements of our device, we have found, among other things, that the shell and the tapered surface on the body member form a gage indicating the ultimate sealing characteristics between the two elements, and we have also found that by the provision of such cooperating tapered surfaces, when assembled any scratches that might be incurred are limited to small areas as distinguished from prior art cylindrical surfaces where the shell and body might be fitted one over the other.

Accordingly, still another object of our invention is a new and improved method of forming work or tool holding devices of the type described.

Other and more particular objects of our invention will be apparent to those skilled in the art from the following description and drawings forming a part hereof and wherein:

Fig. 6 is a partial sectional view of a mandrel similar to the mandrel shown in Fig. 3 but adapted to be power actuated;

Fig. 7 is a partial sectional view of a chuck similar to the chuck shown in Figs. 4 and 5 but with the means to cause expansion of the shell located transverse of the shell; and Fig. 8 is a cross-sectional view of the chuck shown in Fig. 7 taken along line 8—8 and looking in the direction of the arrows.

Figure 1:
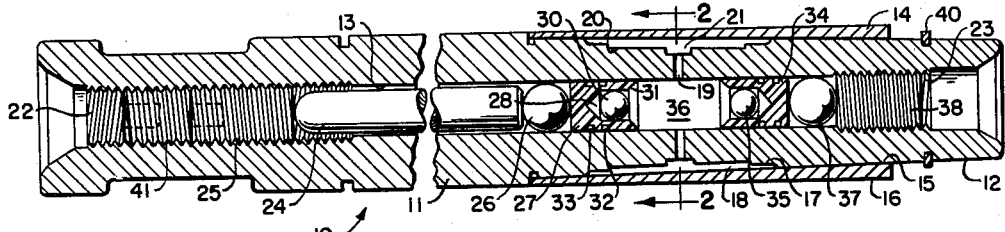
Fig. 1 is a cross-sectional view of a tool or work holding device or mandrel constructed in accordance with the teachings of our invention.
Figure 2:
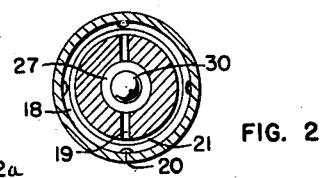
Fig. 2 is a sectional view taken along line 2—2 of Fig. 1 looking in the direction of the arrows.

Turning now to Figs. 1 and 2 of the drawing, it can be seen that our hydrostatic tool or work holding device or mandrel 10 comprises a relatively stiff elongated generally cylindrical body member 11 provided with a tapered and recessed portion or surface 12 and an axial bore 13. The end of the body member 11 opposite the tapered surface 12 is suitably formed to provide a means of driving the body member in a machine tool.

Surrounding, or disposed about, a portion of tapered and recessed surface 12 is a relatively thin metallic shell or expandable member 14, preferably of beryllium-copper, having an inner tapered surface 15 and an outer cylindrical surface 16. Outer surface 16 is the tool or work holding surface for the device.

The body member 11 is provided with a shallow peripheral groove 17 of a predetermined depth and width which forms with the inner surface 15 of the shell member 14 a hydrostatic pressure or expansion chamber 18 which is in fluid communication with the inner bore 13 of the stiff body member 11 by one or more radially extending passages 19 (two shown).

In the preferred form of our invention the stiff body member 11 is provided with a plurality of relatively thin axial grooves or channels 20 each of a length slightly less than length of the chamber 18 and in fluid communication with the passages 19 by still another deeper but axially narrower recess 21 of the periphery of the stiff body member 11. The purpose of the grooves 20 and recess 21 will be apparent from a more detailed description hereinafter.

Axial bore 13 is provided with internal threads 22 and 23 at its left and right ends, respectively, and is further provided at its left end with a plunger 24, of a diameter slightly less than bore 13, abutting at its left end against a set screw 25 and at its right end against a steel ball 26. Movement of the set screw 25 inward and outward i.e., to the right or left with respect to the body member 11, causes movement of the steel ball 26 against one end of a cup-like seal 27 of suitable plastic such as and preferably nylon.

Cup-like seal 27 comprises a partially hollow or counter bored center 28 forming a piston head configuration to receive a steel ball 30 of lesser diameter than steel ball 26. Small steel ball 30 is pressed into the counter bored center 28 so as to urge the outer periphery of the seal into sealed relationship with the bore 13 even when the holding device is under no hydrostatic pressure. Cup-like seal 27 is further provided with the chamfer 31 on its counter bore 28 and with a plurality of peripheral grooves 32, 33 (two shown) which cooperate with the bore 13 to prevent leakage of fluid pressure. Chamfer 31 urges the edges of the seal outwardly under pressure and any leakage that might occur will be trapped in the first peripheral groove 32 and any leakage beyond that point will be trapped in the second peripheral groove 33.

Seal 27 is thus in sealing relationship with the bore 13 and faces a similar cup-like seal 34 also having a ball 35 in its counter bore. Since the configuration of seal 34 and its operation is identical with the seal 27 no further description is deemed necessary herein except to say that the two seals 27 and 34 together with the bore 13 define a motive pressure chamber 36 which is in communication with the pressure expansion chamber 18 by passages 19.

At the right end of the seal 34 we have also provided still another steel ball 37, similar to steel ball 26, which abuts against a set screw 38 whereby movement inward and outward of the screw 38 causes ultimate movement of the seal 34.

From the above description it can be seen that we have provided a means of exerting force on any fluid which is contained in the pressure chamber 36 and to ultimately cause this fluid to exert pressure against the inner surface 15 of the shell 14 to cause radial or outward expansion thereof. This means of exerting force comprises the rotation of the set screw 38 inwardly or to the left as illustrated in Fig. 1 causing the seal 34 to move toward the seal 27. Small steel balls 30 and 35, being press fitted into their respective sockets of the seals cause initial tight engagement with the inner periphery of the bore 13 and movement towards each other causes pressure on the fluid to be built up with consequent expansion of the walls of the seals 27, 34 ahead of the balls 30, 35 so as to tightly seal the bore against leakage even under very high pressure. The viscosity of the fluid we prefer to use contributes to the simplicity of our sealing arrangement.

As previously mentioned, we have found that, when pressure is exerted on the fluid in the pressure chamber 36 to expand the shell 14 radially outwardly, there is a time lag between the maximum pressure to be obtained in the pressure chamber 36 and the final position of the shell 14. Conversely, when the pressure is relieved from the pressure chamber 36 there is a time lag between the time that the pressure is actually relieved and the shell returns to its normal position. This time lag is due to the highly viscous fluid we prefer to use as will be explained hereinafter.

To reduce this time lag, we have provided the heretofore mentioned plurality of grooves or channels 20 and peripheral groove 21 opening thereinto. Thus the fluid, preferably relatively heavy and viscous, is given ready access to the expansion chamber 18 and may flow thereto and therefrom in a minimum time.

As hereinabove mentioned, one outstanding feature of our invention comprises the press-fitting of the shell 14 to the stiff body member 11. As previously explained, we have constructed the inner surface 15 of the shell 14 to be tapered to complement the tapered portion 12 of the stiff body member 11 and by press fitting the shell to the stiff body member a fluid tight seal is accomplished without welding or brazing thus eliminating inherent, non-uniform, internal stresses that occur by such methods. Furthermore, by thus press fitting the shell to the body member it is unnecessary that the inner surface 15 of the shell contact the tapered surface of the body member except at the distance required to form a tight press-fit such as illustrated in Fig. 1. Any scratches that might be made on the inner surface of the shell and which cause stress concentration points during operation are limited to a small area as contrasted to scratches that might be made over the entire length of the inner surface if the members were not tapered—a considerable improvement over prior art devices. Another important aspect of the tapering of the surfaces of the shell 14 to body member 11 is the fact that, when in assembly the shell is merely telescoped on the tapered portion with little or no force, the distance that the shell must be moved to be properly seated in sealing relationship of the body member is an indication of the amount of press fit. Thus the two members serve as a gage for the manufacture of the device.

Furthermore, as previously mentioned, still another important aspect of the tapering of the surfaces of the shell and the body member is the fact that, if the pressure created in the expansion chamber 18 is greater than can be properly maintained by the press fitting of the shell to the body member, the shell merely slides to the right as illustrated in Fig. 1 permitting the pressure in the chamber 18 to vent. Movement of the shell to the right is stopped by any suitable means such as stop ring 40. Thus the tapering of the two surfaces in cooperation with the stop ring define a safety feature in our holding device not feasible in prior art devices. Such a safety factor is a particularly important improvement over prior art devices which were sealed to the stiff body members by brazing or welding with consequent residual non-uniform stresses having a tendency to rupture as previously mentioned.

The above features together with the use of beryllium-copper for the shell 14 contribute to the excellent functioning of our device and so far as we know we are the first to use such a metal in devices of this type.

With the simplified internal structure for creating pressure in the pressure chamber 36, a new method of filling such devices is involved. This method is considerably simplified over prior art methods and is particularly adaptable for rather highly viscous fluids which we prefer to use for this purpose. Our experiments have found that uncured synthetic rubber, being highly viscous, is eminently satisfactory.

To fill our device with such fluids, set screw 38 is bottomed or threaded to its furthermost left-hand position and outer or locking screw 41 and set screw 25 are removed from the bore together with the plunger 24, ball 26, and seal 27. The measured amount of fluid is inserted in the bore and the set screw 25 is brought to bear tightly against the ball 26, and seal 27 to urge the pressure in the chamber 36 to a predetermined maximum amount as required of the expansion of shell to be desired. We have found that with our arrangement and with the proper amount of fluid in the chamber 36 after a short period of time any or all air bubbles or the like that might be in the chamber 36 or any other passageway or in the expansion chamber disappear by either being forced out past the seals 27 or 34 or by being absorbed into the pressure fluid.

As can be appreciated, by the movement of the set screw 25, the exact amount of expansion of the shell 14 can be reached. Thus the position of the set screw 25 becomes determined according to the desired amount of expansion of the shell 14 and when the set screw is in the exact selected position, the locking screw 41 is inserted and bottomed against the top of the set screw 25 to lock the same in a conventional manner. Further expansion and contraction of the expanding shell is then accomplished by movement of the set screw 38 from the other end of the bore 13 and becomes, during normal operation, the usual method of expanding and contracting the shell. In other words, bottoming the set screw 38 will give the precise amount of expansion required and prevent over-expansion when a workpiece or tool is not on our device, an important improvement over prior art devices.

Figure 3:
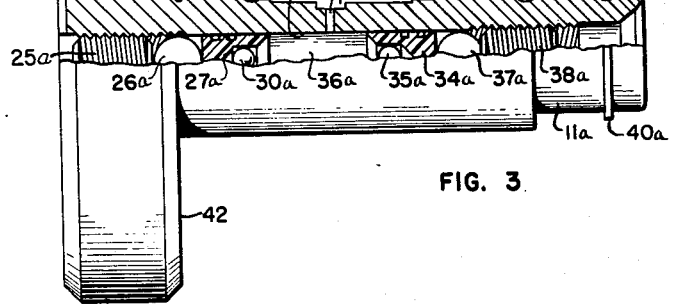
Fig. 3 is a partial cross-sectional view of a mandrel similar to the mandrels shown in Figs. 1 and 2 but arranged to be connected to one end of a spindle of a machine tool.

Turning now to Fig. 3, it can be seen that this figure illustrates the type of mandrel shown in Figs. 1 and 2 except that the stiff body member 11a is provided with a radially extending flange 42 having suitable bores and counter bores 43 whereby the mandrel may be held against the end of a spindle of a machine tool (not shown), if desired. Since the construction and operation of the mandrel 11a shown in Fig. 3 is identical with the mandrel shown in Fig. 1 and 2 with the exception of the flange 42, the reference numeral indicating like parts having the same function have been utilized except with the suffix $a$ after each numeral. It is to be noted, however, that there is no locking screw in the mandrel of the Fig. 3 comparable to the locking screw 41 in Figs. 1 and 2. The reason for this is that the locking screw 41 has for its primary purpose the protection against an inadvertent movement of the set screw 25 thus destroying its pressure regulating characteristic and to force the use of the set screw 38 to operate pressure in the pressure chamber 36. Since the mandrel 11a is abutted to the end of a spindle, the chances of an inadvertent movement of the set screw 25a are minimized.

It is to be noted also that because of the stiff body member 11a, plunger 24, or its equivalent, is also eliminated and set screw 25a operates directly against the steel ball 26a. A plunger such as plunger 24 of Figure 1 may be used in the mandrel of Fig. 3 to provide more adjustment length as more axial length is available in the embodiment.

Figure 5:
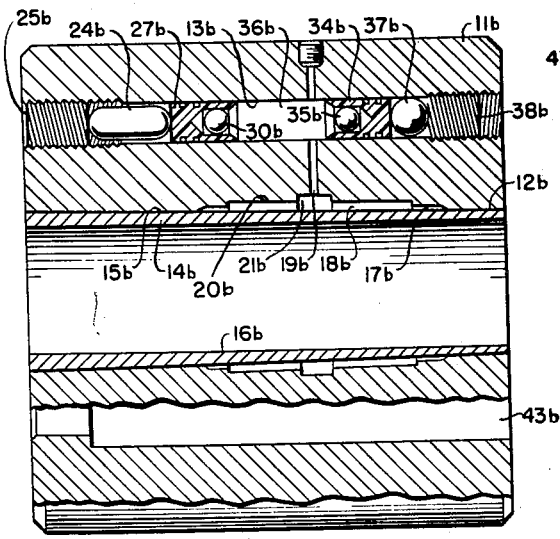
Fig. 5 is a sectional view of the chuck shown in Fig. 4 taken along the line of 5—5 of Fig. 4 and looking in the direction of the arrows.
Figure 4:
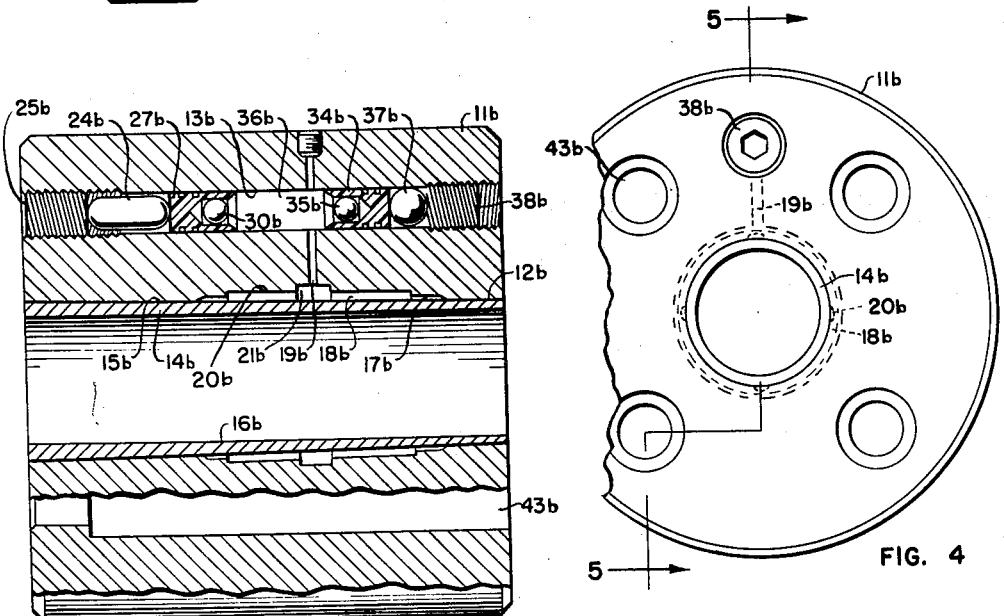
Fig. 4 is an end view of a chuck constructed in accordance with our invention and adapted to be connected to a spindle of a machine tool.

Turning now to the chuck illustrated in Figs. 4 and 5 it will be observed that we have provided a stiff body member 11b with an internal bore 13b which is eccentric to the axis of rotation of the body member 11b as contrasted to the mandrels shown in Figs. 1, 2 and 3. Furthermore, our expandable shell 14b with its tapered surface 15b which cooperates with an axially centrally located tapered surface 12b is disposed so that the shell is expanded radially inwardly so that the work holding or tool holding surface 16b comprises the axial bore of the tool. With this arrangement, the stiff body member 11b may be bored and counter bored, as illustrated at 43b (Fig. 4), so that the same may be properly affixed to the end of a spindle of a machine tool (not shown). With this arrangement the construction and operation of the various parts remain the same as in connection with the mandrels of Figs. 1, 2 and 3 and those elements having a like function in this device having been given like reference numerals to identify like parts in Figs. 1 and 2 except with the suffix $b$ added. It is to be noted that the set screw 38b exerts pressure in the chamber 36b which in turn reacts in the expansion chamber 17b to hold or grip the tool as previously explained. In a manner similar to the mandrel shown in Fig. 3, the locking screw 41 has been eliminated for the same reason and in this embodiment the plunger 24b is utilized in lieu of the steel ball 26. However, as can be appreciated, whether or not a plunger, such as 24 or 24b, or a steel ball, such as 26 or 26a, or both, is utilized depends upon the length of the body member.

In Fig. 6, we show still another form of our mandrel, yet somewhat similar to the mandrel shown in Fig. 3 and where in Fig. 6 like parts have a function similar to the function in the mandrels shown in Figs. 1, 2 and 3, we identify such parts with the same reference numerals except with the suffix $c$ added. It is to be noted, however, that in this embodiment, we have provided a power actuatable plunger 45 to cause compression of the fluid in the chamber 36c in lieu of the set screw 38 or 38b. In this embodiment a centering means 46 of a machine tool, being power actuated either by hand or hydraulically, may be urged against the plunger 45 at its conically tapered counter bore 47 shown in the right in the end of the plunger 45. Force supplied by the centering means 46 will urge the plunger to the left, as shown in the drawing, to a distance equal to the difference in distance between the relative position of the tapered surface 47 and the conically tapered surface 48 in the stiff body member 11c. This difference in distance is a function of the pressure to be obtained to expand the shell 14c as can be understood and corresponds to the bottoming of the set screw 38 or 38b in the mandrels of Figs. 1–3. To retain the plunger 45 in its position radially extending relatively thin flange 50 is provided which acts against a snap ring 51 in the counter bore 52 of the body member 11c.

Thus as can be seen, our device lends itself readily to power action of a machine tool to hold a work piece on the expandable shell 14c.

In Figs. 7 and 8, we have shown a chuck similar to the chuck shown in Figs. 4 and 5 except that the body member 11d is much thinner with the additional advantages of providing more clearance while in a machine tool and being much lighter in weight we have provided a flange 42d which is similar in function and operation to the flange 42 of Fig. 3, but, in this embodiment the flange 42d is located axially centrally of the chuck as illustrated whereby the left end may be adapted to fit within a spindle of a machine tool. However, if desired, the flange 42d could be located at the extreme right end of the body member 11d in a manner similar to flange 42 of Fig. 3. Flange 42d enables us to accomplish the thinness of the body member 11d, as contrasted to the type of chuck shown in Figs. 4 and 5, by being provided with a bore 13d transverse to the main bore or axis of the chucking means comprising the tool or work holding surface 16d of the shell 14d. But for the location of the bore 13d, the construction of the device shown in Figs. 1 through 6 and like parts having the same function are given like reference numerals but with the suffix d. It is to be noted, however, that we have shown in this figure a locating pin 40d which may function as a stop means similar to stop ring 40 shown in Figs. 1 and 3. Likewise, a stop pin 40d or ring 40 may be utilized in the chuck shown in Figs. 4 and 5.

Where herein the various parts of our invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

We claim:

1. An expanding hydrostatic type holder for a tool or work, comprising a relatively thin expansible shell having one surface thereof cylindrical and the other surface tapered, a relatively thick substantially inexpansible body having a tapered surface cooperating with said tapered shell surface to afford tight securement between the shell and body, a recess in said tapered body surface defining an expansion chamber with the tapered shell surface, a bore in said body, passage means connecting said bore and expansion chamber, fluid in said passage means, bore, and chamber, and means in the bore to exert pressure on said fluid for effecting expansion of the shell, said tapered surfaces facilitating assembly of the shell and body and acting to effect longitudinal shifting of the shell on the body upon development of fluid pressure in excess of a predetermined value to relieve such excess pressure.

2. A holder substantially as defined in claim 1, in which said shell is formed of a beryllium-copper alloy.

3. A holder substantially as defined in claim 1, in which said body has stop means thereon spaced from that end of said shell which leads in said longitudinal shifting thereof, said stop means being adapted for engagement by said shell end to limit the longitudinal shifting and prevent disengagement of the shell from the body.

4. An expanding hydrostatic type holder for work or tools, comprising a relatively thin expansible shell having one surface thereof cylindrical and the other surface tapered, a relatively thick substantially inexpansible body having a tapered surface cooperating with said tapered shell surface to afford tight securement between the shell and body, a bore in said body, a recess in said tapered body surface defining an expansion chamber with the tapered shell surface, passage means connecting said bore and expansion chamber, a thick highly viscuous fluid in said bore and passage means and chamber having relatively slow response to pressure change, means in the bore to exert pressure on said fluid for effecting expansion of the shell, and means for accelerating response of the fluid to change in pressure applied by said pressure-exerting means, said accelerating means including a conformation of said recess progressively increasing in the direction of said shell and also including a plurality of passages as said passage means.

5. A hydrostatic type expanding holder for work or tools, comprising a relatively thin expansible shell having one surface thereof cylindrical and the other surface tapered, a relatively thick substantially inexpansible body having a tapered surface cooperating with said tapered shell surface, a bore in said body, means including said tapered shell surface defining an expansion chamber, passage means connecting said bore and expansion chamber, fluid in said passage means, bore, and chamber, means in the bore for exerting pressure on said fluid to effect expansion of the shell, and means for securing the body and shell together in tightly sealed relation comprising a press fit between the cooperating tapered surfaces of the shell and body.

6. A hydrostatic type expanding holder for work or tools, comprising a relatively thin expansible shell having one surface thereof cylindrical and the other surface tapered, a relatively thick substantially inexpansible body having a tapered surface cooperating with said tapered shell surface, means including the tapered shell surface defining an expansion chamber, a bore in the body, passage means connecting said expansion chamber and bore, fluid in said passage means, bore, and chamber, and means in the bore for exerting pressure on said fluid, said pressure-exerting means comprising means on opposite sides of the intersection of said passage means with the bore for preventing leakage of fluid out of the bore, at least one of said leak-preventing means being movable longitudinally of the bore, a threaded portion extending from the end of the bore adjacent which said one leak-preventing means is disposed, a screw working in said threaded portion engaging said one means to effect longitudinal movement thereof inwardly of the bore to exert pressure on the fluid and allow outward movement thereof to decrease the pressure, the extent of said threaded portion inwardly of the bore being predetermined to limit the inward movement of said screw and of said one means for limiting maximum pressure of the fluid to a predetermined value corresponding to said inward movement limit.

References Cited in the file of this patent

UNITED STATES PATENTS

| | | |
|---|---|---|
| 2,331,504 | Raymond | Oct. 12, 1943 |
| 2,480,369 | Jasper | Aug. 30, 1949 |
| 2,499,241 | Courtot | Feb. 28, 1950 |
| 2,636,254 | Gunning | Apr. 28, 1953 |
| 2,744,756 | Atherholt | May 8, 1956 |
| 2,797,602 | Atherholt et al. | July 2, 1957 |
| 2,797,603 | Atherholt et al. | July 2, 1957 |
| 2,797,604 | Atherholt | July 2, 1957 |

FOREIGN PATENTS

| | | |
|---|---|---|
| 745,845 | Germany | May 15, 1944 |